UNITED STATES PATENT OFFICE.

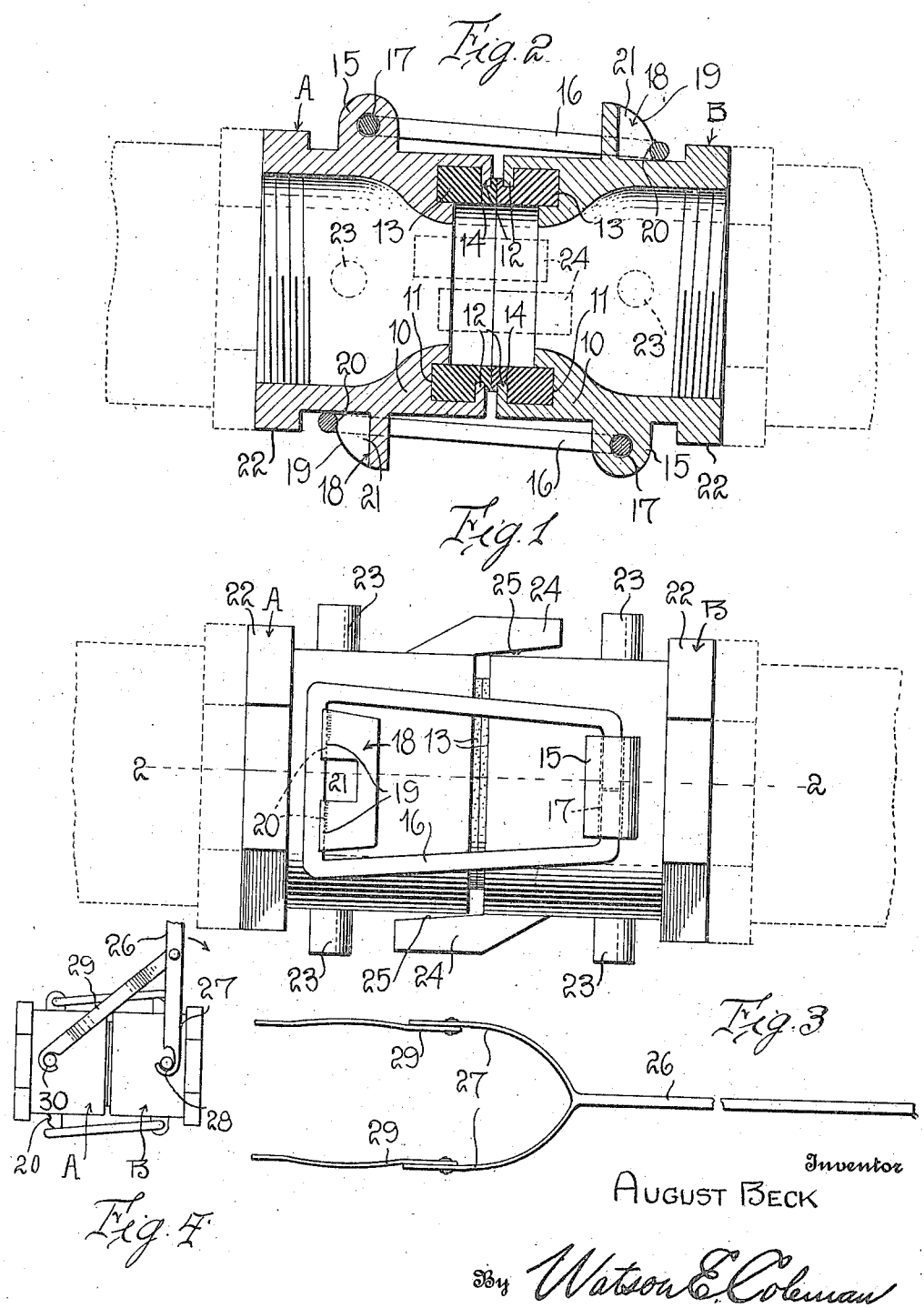

AUGUST BECK, OF TELLURIDE, COLORADO.

PIPE-COUPLING.

1,248,601.  Specification of Letters Patent.  Patented Dec. 4, 1917.

Application filed September 27, 1916. Serial No. 122,491.

*To all whom it may concern:*

Be it known that I, AUGUST BECK, a citizen of the United States, residing at Telluride, in the county of San Miguel and State of Colorado, have invented certain new and useful Improvements in Pipe-Couplings, of which the following is a specification, reference being had to the accompanying drawings.

This invention relates to devices for coupling hose pipe or pipe of like character and the general object of the invention is to provide a coupling in which the coupling members may be urged toward each other with relatively great force so as to securely close the joint between the coupling members.

A further object of the invention is the provision of coupling members so formed that they may be urged toward each other and accurately seated in register and provided with clamps which may be readily engaged to hold the coupling members in engagement, and which may be readily disengaged.

A further object of the invention is to provide a coupling so formed that it may be used where there is considerable pressure.

Other objects will appear in the course of the following description.

My invention is illustrated in the accompanying drawings wherein,

Figure 1 is an elevation of a coupling constructed in accordance with my invention;

Fig. 2 is a longitudinal section thereof on the line 2—2 of Fig. 1;

Fig. 3 is a plan view of the coupling wrench; and

Fig. 4 is an elevation of the coupling showing the wrench applied thereto.

Referring to these figures it will be seen that my improved coupling comprises two members A and B. These members are of the same construction. Each of these members is thickened at its end as at 10 and an annular recess 11 is formed in this thickened portion, the outer wall of the recess being formed with an inwardly projecting annular flange 12. Disposed within the recess 11 of each coupling member is a gasket 13 of rubber or other suitable material, this gasket being formed with a groove 14 upon its outer face to receive the wall 12 and interlock with the same so as to prevent the gasket from being blown out under high pressure. It will further be seen that the thickened portion 10 forms a wall which protects the gasket from any pressure which would tend to tear it loose from its interlocking engagement with the wall 12. When the coupling members A and B are disposed in engagement with each other the gaskets 13 are compressed and prevent any leakage of water between the coupling members.

For the purpose of holding the coupling members in tight engagement with each other I form each coupling member at one point with an upwardly projecting lug 15 and provide an approximately U-shaped bail or locking link 16 which extends transversely through a passage 17 formed in the lug and thus has pivotal engagement therewith. The free end of the bail is wider than the hinged end thereof as is clearly seen in Fig. 1. Each coupling member is also formed at a point diametrically opposite to the lug 15 with an outwardly projecting lug 18 which is approximately oblong in form and has its face away from the end of the coupling member downwardly and rearwardly inclined or rounded as at 19. At the base of this face 19 the lug is transversely channeled as at 20 so that the bail 16 of the opposite coupling member may be forced down over the rounded face 19 and will then slip into and interlock with this channel 20, as illustrated clearly in Fig. 2.

In order to provide for releasing the links when the links are very tightly engaged with the corresponding lugs, I form each of the lugs 18 with a recess or cut away portion 21 which opens upon the front face of the lug and across which the bail extends when the bail is in operative position. This opening 21 permits the insertion of a tool whereby the link or bail may be engaged to draw it out of its interlocking engagement with the channel 20. The lug 18 forms a fulcrum or bearing for the tool which may be used to pry out the link or bail.

Each coupling member is screw threaded for engagement with a corresponding pipe (not shown) and is provided with a hexagonal head 22 whereby a wrench may be applied to the coupling member. The coupling members are also formed each with a pair of laterally projecting studs 23 whereby a coupling tool may be applied to the coupling members to draw them together. Each of the coupling members is also formed with the guiding lugs or centering lugs 24, the centering lug on one member being disposed in diametrically opposite relation to the centering lug on the other coupling member. Each centering lug is formed with a beveled inner face 25 so as to guide the opposite coupling member into registering. For the purpose of drawing the coupling members toward each other against pressure, I may use the wrench or coupler illustrated in Fig. 3. This comprises the lever or handle 26 which is forked at its lower end to provide the two arms 27, the extremities of these arms being cut away to form hooks 28 adapted to engage with one set of studs 23. Pivotally connected to the arms 27 above the hooked ends thereof are the links 29 which are also formed at their lower ends with the reversely disposed hook portions 30 which are adapted to engage with the other pair of studs 23. It will be obvious now that when it is desired to couple the two sections, the hooks 28 are engaged with one set of studs 23, the hooks 30 are engaged with the other set of studs 23 and then the lever is shifted in the direction of the arrow, Fig. 4, which will draw the two coupling sections firmly toward each other so that the links or bails may be turned down into locking position. It is of course understood that when there is very little pressure in the pipe this wrench is not needed in order to connect the pipes or coupling sections. Where there is pressure, however, the wrench must be used. The links 29 are slightly bowed in order to clear the guide lugs 24.

A coupling of the character described is very cheaply made, it is not liable to breakage because there are few projecting parts, and is thoroughly effective in action. The coupling sections may be quickly coupled to or uncoupled from each other, and a thoroughly water-tight joint is secured.

It is to be noted that a coupling constructed in accordance with my invention is very easy to couple and, when once coupled, all possibility of accidental detachment of the parts is precluded, no matter how the coupling is used in service. Besides, the two halves are interchangeable one with the other, and the gasket is so positioned and formed that it cannot be blown out, should the coupling be left apart and pressure turned on.

Having described my invention what I claim is:

1. A pipe coupling comprising two coupling members adapted to confront each other, each member being formed in its confronting end with an annular recess. a gasket disposed in each recess, a clamping link pivotally mounted on each coupling member and in diametrically opposite relation to the clamping link on the other coupling member, each coupling member being formed with a lug over which the clamping link of the opposite coupling member may engage, and centering members mounted upon each coupling member and projecting beyond the end of the corresponding coupling member, and having inwardly and centrally beveled inner faces to thereby guide the coupling members into alinement with each other.

2. A coupling of the character described comprising opposed coupling members formed on their confronting faces with annular recesses, gaskets disposed in said recesses and adapted to bear against each other, means carried on the coupling members for centering the coupling members with relation to each other, a lug projecting from each coupling member, a loop-shaped link pivotally mounted upon each lug, each coupling member having opposite the lug an outwardly projecting lug with a rounded rear face formed with a channel at its base and over which the loop-shaped link of the opposed coupling member is adapted to engage, each of the last named lugs being formed with a recess for the insertion of a tool whereby the engagement between the lug and the link may be released.

In testimony whereof I hereunto affix my signature in the presence of two witnesses.

AUGUST BECK.

Witnesses:
CARL LINDELL,
CARRIE OLSSON.